United States Patent [19]

Cheung

[11] Patent Number: 4,620,226

[45] Date of Patent: Oct. 28, 1986

[54] APPARATUS FOR PRODUCING AUDIO AND VISUAL SIGNALS FOR MODULATING A TELEVISION SYSTEM CARRIER SIGNAL

[76] Inventor: William S. H. Cheung, 95B Robinson, Hong Kong, Hong Kong

[21] Appl. No.: 611,249

[22] Filed: May 17, 1984

[51] Int. Cl.$^4$ ............................................. H04N 7/04
[52] U.S. Cl. ................................... 358/143; 358/198; 331/108 R; 331/116 R; 331/177 V; 332/16 T; 332/26
[58] Field of Search ............... 358/141, 142, 143, 144, 358/197, 198; 331/108 D, 108 R, 108 B, 135, 39, 175, 73, 116 R, 177 V, 154; 332/16 R, 16 T, 26

[56] References Cited

U.S. PATENT DOCUMENTS

| | | | |
|---|---|---|---|
| 3,581,240 | 5/1971 | Enderby | 332/26 |
| 3,995,233 | 11/1976 | Waku | 332/26 |
| 4,054,794 | 10/1977 | Laughlin et al. | 358/143 |
| 4,088,968 | 5/1978 | Pradal et al. | 332/26 |
| 4,442,415 | 4/1984 | Ashida | 332/26 |
| 4,546,387 | 10/1985 | Glaab | 358/143 |

OTHER PUBLICATIONS

Data Sheet, "National Semiconductor LM 1889 TV Video Modulator", pp. 11-28 thru 11-36.

Primary Examiner—James J. Groody
Assistant Examiner—Michael D. Parker
Attorney, Agent, or Firm—Pollock, Vande Sande & Priddy

[57] ABSTRACT

A television signal generator for producing a composite RF signal without high level intermodulation products. A signal network is provided to linearly combine a first video modulated carrier signal and a second carrier frequency of the same frequency modulated with an audio modulated subcarrier. An audio subcarrier generator is disclosed having a ceramic resonator for a frequency determining circuit element. The resonator is parallel connected with a voltage sensitive reactance element to provide a frequency modulated subcarrier in response to a modulating voltage.

4 Claims, 1 Drawing Figure

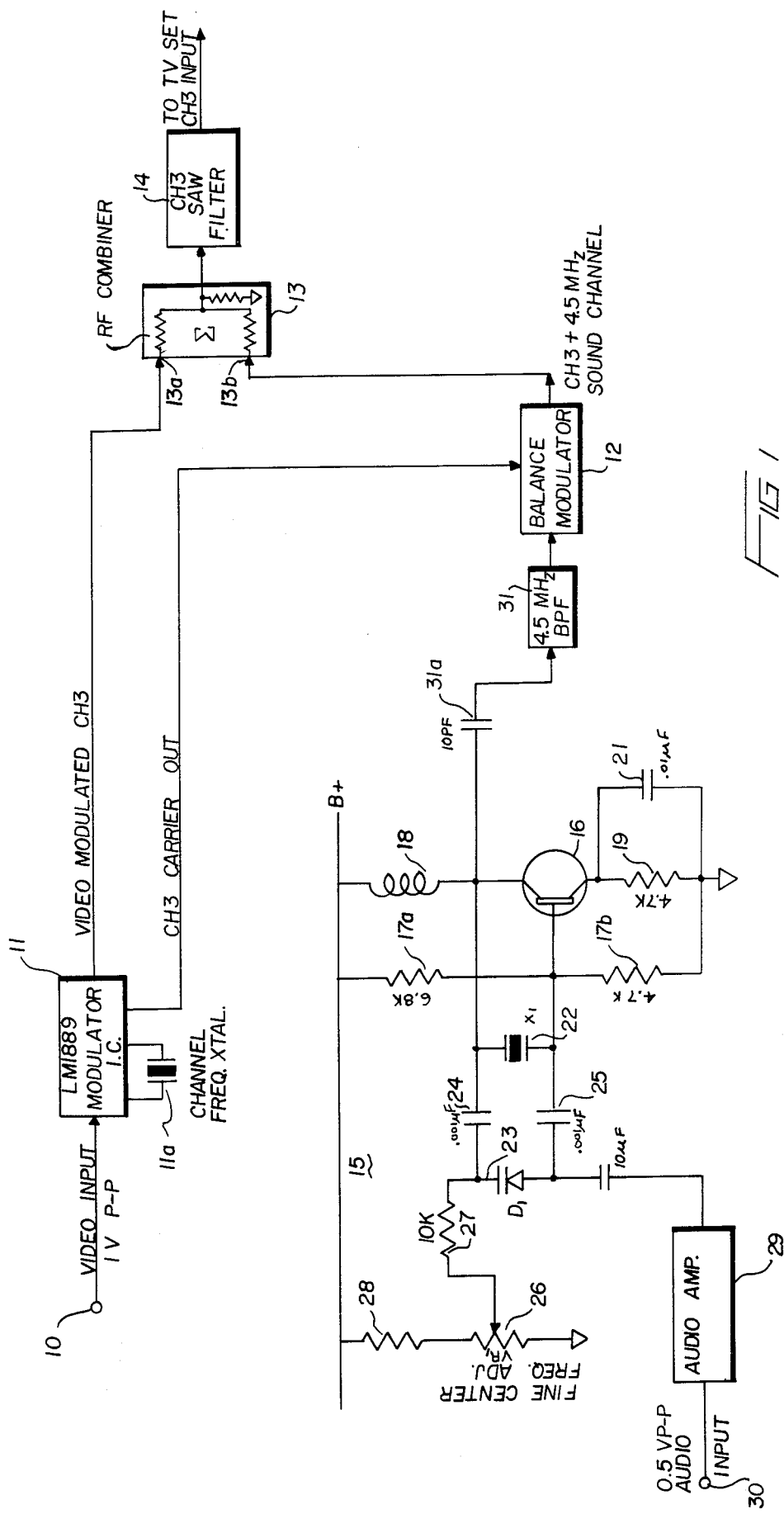

APPARATUS FOR PRODUCING AUDIO AND VISUAL SIGNALS FOR MODULATING A TELEVISION SYSTEM CARRIER SIGNAL

The present invention is related to modulation systems for television systems. Specifically, a system for generating a low level television RF signal for general use in video recorder output modulators, baseband decoder output modulators for cable or subscription broadcasts and other applications is described.

The existing one chip low level television modulator IC, such as National Semiconductor LM 1889 and Motorola MC1374, etc., suffers numerous deficiencies. The first of these deficiencies is the lack of frequency stability and tolerance of the FM audio subcarrier which exceeds ±1 KHz range. The second of these deficiencies includes a high level of intermodulation products which results from the audio subcarrier and chroma subcarrier mixing.

The present invention offers a high degree of audio subcarrier frequency stability and tolerance, and also avoids the production of the intermodulation products between the audio subcarrier and chroma subcarrier.

SUMMARY OF THE INVENTION

It is an object of this invention to provide a modulated signal for a television receiver.

It is a more specific object of this invention to provide a low level RF television signal which avoids the production of high level intermodulation products.

It is still another object of this invention to provide an audio subcarrier signal having high frequency stability and improved frequency tolerance with respect to the standard video subcarrier frequency.

These and other objects are provided by apparatus in accordance with the invention. A signal network provides a composite RF signal. The network receives on one input a video modulated carrier signal and on another input receives a second carrier signal of the same frequency, modulated with an audio FM modulated subcarrier.

In a preferred embodiment of the invention, an audio frequency subcarrier FM generator comprises a transistor oscillator which includes in the feedback network a frequency determining ceramic resonator in parallel with a voltage controlled reactance element which is preferably a varicap diode. The voltage controlled reactance element receives the program audio signal as a modulation voltage.

The resulting frequency modulated audio subcarrier is applied to one input of a balanced modulator which receives on another input the television channel carrier frequency signal.

The balanced modulator output is applied to an RF signal combiner along with a second carrier frequency signal of the same frequency which is modulated with the program video. The resulting linearly combined signal is substantially free of troublesome intermodulation products.

DESCRIPTION OF THE FIGURES

FIG. 1 is a schematic drawing of a preferred embodiment of the present invention.

DESCRIPTION OF THE PREFERRED EMBODIMENT

Referring now to FIG. 1, there is shown a schematic drawing of apparatus in accordance with a preferred embodiment of the invention. The apparatus includes a separate video signal modulator 11 which receives a program picture video signal on terminal 10 which includes a standard luminance signal frequency interleaved with an associated chroma signal having a 3.58 mHz subcarrier and a television channel carrier frequency signal. The television channel carrier frequency signal, identified as having a frequency of channel 3, is also applied to a balanced modulator 12 where it is mixed with a 4.5 mHz audio subcarrier signal containing frequency modulated program audio to produce a carrier signal at the channel 3 frequency with an upper sideband at 4.5 mHz. In practice, the video signal modulator 11 may be National Semiconductor I.C. LM 1889 crystal controlled by a channel 3 crystal 11a, or by a standard LC resonant circuit.

The RF combiner 13 is a resistive or inactive passive adder, which receives the video modulated carrier signal on input port 13a and the audio subcarrier modulated signal on input port 13b. The signals are linearly combined to produce a summation signal comprising a carrier frequency signal modulated with program video signal components. The carrier frequency signal is bandpass filtered in filter 14 before it is applied to the television receiver. Unlike conventional mixing techniques, the passive linear combination of the FM signal modulated with the audio subcarrier signal and the main channel carrier signal modulated with the video signal does not produce objectionable mixing products.

The preferred embodiment of the present invention contemplates an audio subcarrier generator of the type shown which produces a frequency modulated subcarrier at the standard 4.5 mHz frequency sound subcarrier frequency. The oscillator 15 includes a transistor 16 biased by resistors 17a and 17b into a class A bias condition. The emitter of transistor 16 is connected through emitter resistor 19 to one terminal of a DC voltage supply. The collector of transistor 16 is connected through choke inductance 18 to the remaining terminal of the DC voltage supply. Capacitor 21 provides bypassing of emitter resistor 19.

The frequency of oscillations of oscillator 15 is determined by the combination of ceramic resonator 22 and varicap diode 23. Varicap diode 23 is a voltage sensitive diode which is connected in parallel with ceramic resonator 22 through first and second coupling capacitors 24, 25.

The ceramic resonator is selected to have a resonant frequency of 4.53883 mHz ±1 kHz. The ceramic resonator may be of the type known as CERALOCK TM made by the Murata Mfg. Co., Ltd, Kyoto, Japan. A change in capacitance $C_x$ of 23 pf of the varicap diode 23 will produce a frequency shift of 4.5 mHz ±25 kHz, sufficient for the program audio signal. A bias adjust potentiometer 26 is provided to provide exact adjustment of the oscillator center frequency. Resistor 27 connects the varicap 23 to potentiometer 26, and resistor 28 connects the potentiometer 26 to the DC supply voltage.

The audio modulation signal is applied to terminal 30 through a suitable amplification circuit 29 to the varicap diode 23. An effective pulling of the resonant frequency of the ceramic resonator results, which provides a frequency shift of the oscillator frequency. The percentage frequency shift of the oscillator is sufficient to provide the requisite frequency deviations for the audio signal. The resulting frequency modulated signal is coupled by capacitor 31a to a bandpass filter 31. The filtered signal is applied to balanced modulator 12.

Thus, there is described an apparatus which will provide a television carrier signal modulated with program video and audio information. Those skilled in the art will recognize yet other embodiments described more particularly in the claims that follow.

What is claimed is:

1. In a television system, an audio frequency subcarrier generator comprising:
    a transistor oscillator including as one frequency determining element a ceramic resonator;
    a voltage sensitive reactance coupled to said ceramic resonator for shifting the frequency response of said ceramic resonator;
    bias means for applying a DC voltage to said voltage sensitive reactance whereby a center frequency of operation for said transistor oscillator is obtained;
    means for applying an audio modulating signal to said voltage sensitive reactance whereby said oscillator frequency varies with respect to said center frequency;
    a balanced modulator for receiving on one input an unmodulated video carrier signal, and on a remaining input an audio modulated subcarrier from said transistor oscillator; and
    an RF signal combiner circuit for receiving on one input a signal from said balanced modulator, and on another input a modulated video signal carrier.

2. The audio frequency subcarrier frequency generator of claim 1 wherein said voltage sensitive reactance is a varicap diode.

3. In a television system, an audio FM subcarrier generator comprising:
    a transistor having a base, emitter and collector;
    a parallel circuit connecting said transistor collector and base, said parallel circuit including a ceramic resonator having a resonant frequency coincident with an audio subcarrier signal frequency, and a varicap diode;
    an emitter resistor having one end serially connected to said emitter;
    a first capacitor across said emitter resistor;
    means for biasing said transistor to oscillate at a frequency determined by said ceramic resonator; and
    means for applying a modulating voltage to said varicap diode whereby said transistor frequency of oscillation is modulated.

4. In a television system, a circuit for generating a composite video signal having a video signal carrier and audio signal subcarrier modulated with a video and audio signal, respectively, comprising:
    a source of video signals;
    a carrier frequency signal generator;
    a video modulation means for modulating a first carrier signal from said carrier frequency signal generator with said video signals;
    an audio signal subcarrier generator for providing a subcarrier signal frequency modulated with said audio signal;
    a balanced modulator for modulating a second unmodulated carrier signal from said carrier frequency signal generator with said audio modulated subcarrier signal; and
    means for linearly combining a signal from said balanced modulator with said carrier signal modulated with said video, whereby a composite video signal is produced substantially free of intermodulation products.

* * * * *